United States Patent [19]
Inslerman

[11] 3,781,684
[45] Dec. 25, 1973

[54] SINGLE-ANTENNA REPEATER SYSTEM UTILIZING HYBRID TRANSFORMERS

[75] Inventor: Hans E. Inslerman, Long Branch, N.J.

[73] Assignee: The United States of America as represented by the Secretary of the Army, Washington, D.C.

[22] Filed: Mar. 24, 1970

[21] Appl. No.: 22,298

[52] U.S. Cl. .......................... 325/5, 325/21, 343/175
[51] Int. Cl. .............................................. H04b 7/14
[58] Field of Search ........................ 325/3, 4, 5, 8, 9, 325/15, 16, 21, 10, 22, 23; 343/176, 180, 175; 179/170 R, 170 D

[56] References Cited

UNITED STATES PATENTS

| | | | |
|---|---|---|---|
| 2,442,815 | 6/1948 | Kelly | 325/5 |
| 2,229,078 | 1/1941 | Hansell | 325/5 |
| 3,045,185 | 7/1962 | Mathwich | 343/176 X |
| 2,619,635 | 11/1952 | Chait | 343/176 X |

FOREIGN PATENTS OR APPLICATIONS

| | | | |
|---|---|---|---|
| 850,637 | 9/1939 | France | 343/180 |

*Primary Examiner*—Benedict V. Safourek
*Attorney*—Harry M. Saragovitz, Edward J. Kelly, Herbert Berl and Gordon W. Kerr

[57] ABSTRACT

One embodiment of this repeater comprises a multicoupler comprising three hybrid transformers for coupling a pair of transceivers to a single antenna, which may be simultaneously used without interference for transmitting and receiving of different frequencies, to relay signals between stations which would otherwise be out of range of each other. A pair of the multicouplers may be interconnected with another hybrid transformer to couple four transceivers to a single antenna.

3 Claims, 3 Drawing Figures

INVENTOR,
HANS E. INSLERMAN
BY Gordon W. Kerr
Harry M. Saragovitz
Edward J. Kelly
Herbert Berl
ATTORNEYS INVENTOR,
HANS E. INSLERMAN
BY Gordon W. Kerr
Harry M. Saragovitz
Edward J. Kelly
Herbert Berl
ATTORNEYS

SINGLE-ANTENNA REPEATER SYSTEM UTILIZING HYBRID TRANSFORMERS

The invention described herein may be manufactured, used, and licensed by or for the Government for governmental purposes without the payment to me of any royalty thereon.

This invention relates to a communications repeater system for relaying radio signals. The circuit is particularly useful as an airborne repeater used for relaying messages between two or more gound stations or transceivers which may be out of range for direct communication because of line-of-sight limitations or dense foliage which may surround the ground stations. The present system is particularly adapted for use as an airborne repeater or command station carried by a helicopter and linking several ground stations together. The system includes a multicoupler for permitting two or more of the airborne transceivers to simultaneously utilize a single antenna, without interference between them. The single antenna may then be optimally located on the aircraft considering such factors as radiation pattern and aerodynamic drag. Also, the use of a plurality of antennas on an aircraft gives away its mission to the enemy and makes it a prime target.

Microwave repeaters used in fixed installations on the ground usually receive and transmit on the same carrier frequency since it is easy to direct the transmitted carrier in the opposite direction from the received carrier by using highly directional parabolic antennas, and thus prevent "singing" caused by the feedback of the transmitter signal to the receiver. In repeaters of the present type where the carrier frequencies are in the VHF region and where the ground stations are not necessarily on opposite sides of the airborne repeater, it is necessary to transmit and receive on different frequencies and rely on filtering and other circuit techniques for preventing oscillation or singing.

Briefly stated, the preferred embodiment of the present invention comprises a repeater system including a single antenna coupled to a pair of transceivers via a multicoupler comprising three hybrid transformers, arranged so that the two transceivers may simultaneously use the single antenna. The transmitter and receiver of each transceiver is tunable in unison to the same frequency and the modulation or intelligence received by the receiver of the first tranceiver is transferred to the transmitter of the other transceiver, and vice versa, in sequence. The repeater thus relays simplex messages between a pair of ground transceivers, one of which is tuned to the frequency of the first repeater transceiver and the other of which is tuned to the frequency of the second repeater transceiver. When the present repeater is in the standby mode both receivers are connected to the antenna via the multicoupler, ready to receive incoming signals, and both transmitters are also connected to the antenna via the multicoupler, however both transmitters are switched off. Upon reception of a signal by either receiver, a relay associated therewith is energized. This relay disconnects the other receiver from the antenna and switches the other transmitter on. The output of each receiver is connected to the transmitter of the other or second transceiver so that the received signal of each transceiver is transferred or modulated onto the carrier of the other transmitter which operates at a different frequency. When the received signal disappears from the output of the active receiver the relay associated therewith drops out and the system reverts to the standby condition described above. If the other ground station then transmits, the output of the second receiver will energize its relay which will disconnect the first receiver from the antenna and also turn on the transmitter of the first receiver. Thus the repeater can be used to link a pair of ground stations, each of which comprises a transceiver, one ground transceiver being tuned to the frequency of one of the airborne repeater transceiver frequencies and the other repeater transceiver tuned to the frequency of the other ground transceiver. In another embodiment, a pair of multicouplers may themselves be coupled together via another hybrid transformer so that four transceivers may share a single antenna.

It is thus an object of this invention to provide an improved repeater adapted for airborne use.

Another object is to provide a novel and useful airborne communications repeater including a plurality of transceivers which share a single antenna.

A still further object of the invention is to provide an airborne repeater in which two or more transceivers may simultaneously use a single antenna without interference.

These and other objects and advantages of the invention will become apparent from the following detailed description and drawings, in which.

Figure 1:
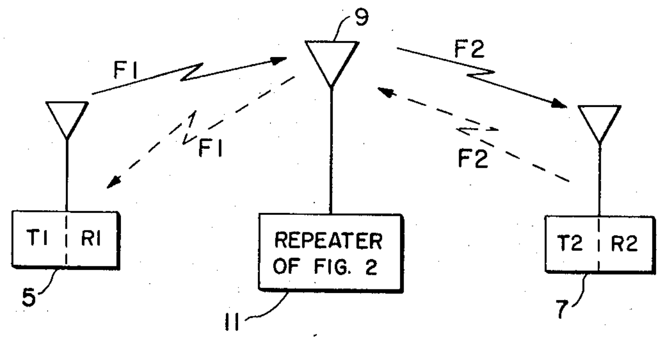
FIG. 1 is a block diagram showing how the airborne repeater relays signals between a pair of ground stations.

In the diagram of FIG. 1, the two ground stations 5 and 7 comprise transceivers each adapted for simplex operation. In this type of operation both transmitter and receiver of each transceiver are tuned in unison to the same frequency, and the receiver and transmitter are alternately operable. When communication is carried on directly between two such stations both transmitters and both receivers would be tuned to the same frequency. In the standby mode both receivers would be listening and each station calls or replies to the other by operating a push-to-talk switch which turns on the station's transmitter and turns off its receiver. In the system of FIG. 1, each of the ground stations are tuned to different frequencies, that is, transceiver 5 has its transmitter and receiver (T1 and R1) both tuned to F1 while the other ground station 7 is tuned to F2. The repeater 11 picks up the transmissions of station 5 on F1 and relays the intelligence thereon on carrier F2, to which the receiver of the other ground station 7 is tuned. Conversely, when station 7 transmits on F2, the repeater relays the intelligence thereon to the other ground station on its receiver frequency, F1.

Figure 2:
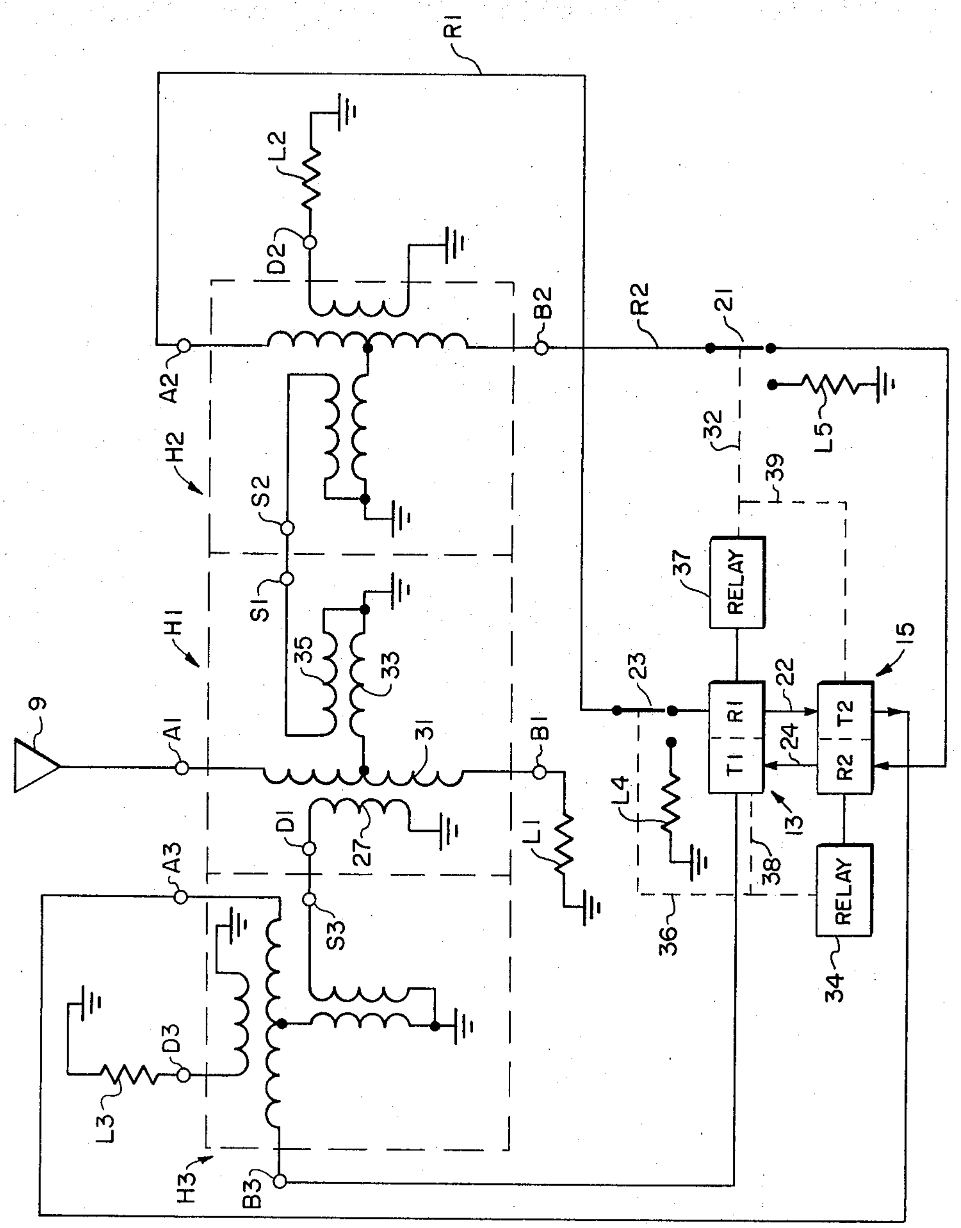
FIG. 2 is a detailed circuit diagram of a preferred embodiment of the repeater including two transceivers.

The circuit of FIG. 2 comprises generally, a single antenna 9 which is coupled to a pair of transceivers 13 and 15 by means of a multicoupler comprising three hybrid transformers, H1, H2 and H3. This type of transformer is well known, however a brief description of the windings and functions of H1 hybrid will be given. H1 comprises a winding 31 which connects a pair of conjugate terminals A1 and B1. Winding 33 extends from the center tap of winding 31 to ground. A winding 35 is inductively coupled to winding 33. Terminal S1 of winding 35 is the sum terminal of the hybrid. A winding 27 is inductively coupled to winding 31 equally on both sides of the center tap thereof. Terminal D1 is the difference terminal of the hybrid. The connections are such that if alternating voltages are applied simultaneously to terminals A1 and B1, the vector sum thereof will appear at the sum terminal S1 whereas the vector difference thereof will appear at difference terminal D1. Further, a voltage applied to the sum terminal will be divided into two equal and in-phase components appearing at terminals A1 and B1, and a voltage applied to the difference terminal results in two equal but out-of-phase components at terminals A1 and B1. The sum and difference ports are isolated in that signals applied to one do not appear at the other. The circuitry and operation of the other two hybrids H2 and H3 are the same as H1 and will not be described in detail, but the connections thereof to form the multicoupler will be described. The conjugate terminals of H2 are labelled A2 and B2 and the sum and difference terminals S2 and D2. Likewise the terminals of H3 are labelled A3, B3, S3 and D3. The antenna 9 is connected to terminal A1 of H1 and terminal B1 to matched load L1 which has the same impedance as the antenna. The sum terminals S1 and S2 of H1 and H2 are connected, as shown. The difference terminal D2 of H2 is connected to a matched load L2. The difference terminal D1 of H1 is connected to sum terminal S3 of H3. The difference terminal D3 of H3 is connected to matched load L3. The terminals A2 and B2 of H2 form the antenna leads R1 and R2 respectively of the two receivers. The lead R2 is connected to the input of the receiver of transceiver 15 via switch 21, actuated by relay 37 which is controlled by the output of the receiver R1 of the other transceiver 13. Similarly the receiving antenna lead R1 of transceiver 13 is connected thereto via switch or contacts 23 of relay 34, actuated by the output of the receiver of the other transceiver 15, via mechanical connection 36. The transmitting antenna lead of the transceiver 13, T1, is connected to the terminal B3 of H3 and the transmitting antenna lead of the other transceiver 15, T2, is connected to terminal A3 of H3. The receiver and transmitter of transceiver 13 are both tuned to a frequency, F1, and transceiver 15 to another frequency F2. The audio or modulation output of receiver R1 is connected to the transmitter T2 of the other transceiver via lead 22 and likewise the output of receiver R2 is connected to T1 via lead 24.

The principle operation of the repeater of FIG. 2 is as follows: The repeater is shown in the drawing in the standby mode wherein both receivers R1 and R2 are connected to antenna 9 ready to receive any signal on their respective frequencies of F1 and F2. In the absence of any received signals, both relays 34 and 37 are de-energized and relay contact 21 is positioned as shown to conect receiver R2 to antenna 9 via the multicoupler. Also the deenergized relay 37 maintains the transmitter T2 off via the mechanical connection 39. For example the relay 37 may control the application of plate voltage to the power amplifier of T2 via connection 39 to switch this transmitter on and off. Similarly, the contact 23 of de-energized relay 34 connects receiver R1 to antenna 9 and the mechanical connection 38 turns transmitter T1 off. It can be seen that the receivers have their antenna leads connected to the A and B terminals of hybrid H2. Incoming signals from antenna 9 pass through the sum terminals S1 and S2 and thence split in two equal-amplitude but out-of-phase components at terminals A2 and B2, to which the two receivers are connected. The phase difference between the two receiver antenna terminals does not affect the operation. If the first receiver R1 receives a signal on frequency F1, the relay 37 will become energized. The relays can be actuated by the presence of a detected received carrier for example by applying the receiver AVC (or AGC) voltage to the relay coil. The energization of 37 disconnects the second receiver R2 from the antenna 9 via contacts 21 and replaces the receiver with matched load L5, and also turns on the second transmitter T2 via connection 39. The received modulation is transferred to T2 operating at frequency F2 via connection 22. The output of T2 is applied to the multicoupler via terminal A3. The transmitted signal passes through hybrid H3, out the sum terminal S3 thereof, into terminal D1 of H1 and thence through hybrid H1 to antenna 9. Due to the isolation between the sum and difference terminals of hybrid H1, none of the transmitted signal applied to terminal D1 appears at the sum terminal S1. Thus the antenna may simultaneously receive on a first frequency and transmit on a second frequency without feedback or singing. by disconnecting the second receiver while the first receiver is active, the second receiver is locked out, thus preventing the other ground station interfering with the signal of the first ground station. When the first ground station stops transmitting, the repeater reverts to the standby condition and the other ground station is then free to utilize the repeater in a way similar to that already described, with the active receiver R2 receiving on F2, transferring the received modulation to transmitter T1, the output of which is applied to terminal B3 and thence to the antenna 9. The operation of relay 34 is analogous to that of relay 37, already described in detail.

Figure 3:
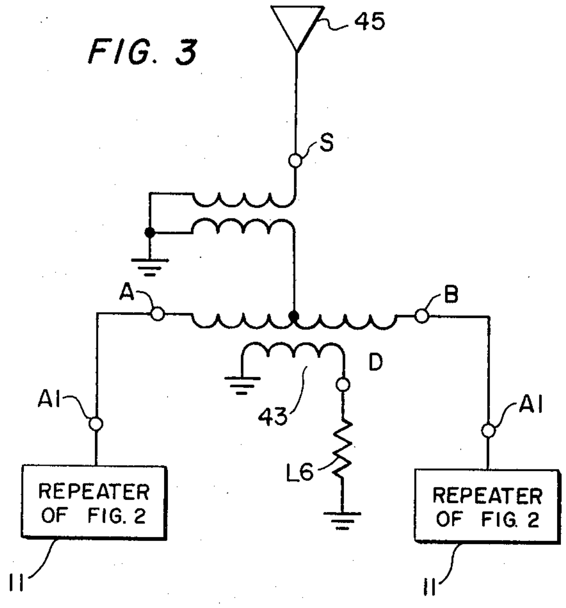
FIG. 3 is a block diagram showing how a pair of the repeaters of FIG. 2 may be coupled to a single antenna utilizing a hybrid transformer.

FIG. 3 shows how two of the two-transceiver repeaters of FIGS. 1 and 2 may be interconnected to a single antenna 45 via another hybrid transformer 43 which is the same as H1, H2 and H3 of FIG. 2. Thus four transceivers may share a single antenna. As can be seen, the antenna terminals A1 of the repeaters 11 are connected to the A and B terminals of the hybrid 43 and the antenna 45 is connected to the hybrid sum terminal.

There is some signal loss in these circuits, for example the matched load L1 of FIG. 2 absorbs half the output power of both transmitters, however the advantages of the single antenna are considered to outweigh this power loss. Further, in line-of-sight communications, the limitation on range is usually the distance of the horizon and not the power output of the transmitter, thus reduced power output is not a serious disadvantage.

While the invention has been described in connection with specific embodiments, obvious variations thereof will be apparent to those skilled in the art.

What is claimed is:

1. An airborne repeater for relaying messages between two ground receivers, each ground transceiver being tuned to a different frequency, said repeater comprising a first transmitter and a first receiver comprising a first transceiver tunable to the frequency of one of said ground transceivers, a second transmitter and a second receiver comprising a second transceiver tunable to the frequency of the other of said ground transceivers; a single antenna; means for connecting the output of said first receiver to the input of said second transmitter; means for connecting the output of said second receiver to the input of said first transmitter; a multicoupler for connecting said first and second transceivers to said single antenna whereby one of said receivers and the other of said transmitters of said transceivers may simultaneously use said antenna, said multicoupler comprising a first, a second, and a third hybrid transformers; each of said transformers having a pair of conjugate terminals, a sum terminal, and a difference terminal; said single antenna being connected to one of the conjugate terminals of said first hybrid transformer; a matched load connected to the other conjugate terminal of said first hybrid transformer; means connecting the sum terminal of said second hyrid transformer to the sum terminal of said first hybrid transformer; means connecting the sum terminal of said third hybrid transformer to the difference terminal of said first hybrid transformer; means connecting the inputs of both receivers to the respective conjugate terminals of said second hybrid transformer, means connecting the outputs of both transmitters to the respective conjugate terminals of the third hybrid transformer; a first relay actuated by a detected carrier signal to said first receiver for disconnecting said second receiver from its conjugate terminal and for turning on said second transmitter during the time of the actuating signal; a second relay actuated by a detected carrier signal in said second receiver for disconnecting said first receiver from its conjugate terminal and for turning on said first transmitter during the time of the actuating signal; so that the receiver of one of said transceivers and the transmitter of the other of said transceivers may simultaneously use said antenna without mutual interference.

2. The airborne repeater of claim 1 wherein the modulation output of each of said receivers is connected to the corresponding transmitter of the other of said transceivers, for modulating the carrier of each of said transmitters with the received modulation of the other transceiver.

3. A repeater comprising a multicoupler for connecting first and second transceivers to a single antenna whereby the receiver of one of said transceivers and the transmitter of the other of said transceivers may simultaneously use said antenna, said multicoupler comprising three hybrid transformers, said antenna being connected to one of the conjugate terminals of one of said hybrid transformers, both of said transmitter outputs being connected to the difference terminal of said one of said hybrid transformers via another of said hybrid transformers and wherein both of the receivers of said first and second transceivers are connected to the sum terminal of said one of said hybrid transformers via still another of said three of said hybrid transformers.

* * * * *